(12) United States Patent
Nakada

(10) Patent No.: US 9,994,136 B2
(45) Date of Patent: Jun. 12, 2018

(54) CUSHION PAD

(71) Applicant: TOYO TIRE & RUBBER CO., LTD., Osaka-shi, Osaka (JP)

(72) Inventor: Toru Nakada, Osaka (JP)

(73) Assignee: TOYO TIRE & RUBBER CO., LTD., Itami-shi (JP)

( * ) Notice: Subject to any disclaimer, the term of this patent is extended or adjusted under 35 U.S.C. 154(b) by 207 days.

(21) Appl. No.: 14/805,681

(22) Filed: Jul. 22, 2015

(65) Prior Publication Data

US 2016/0023584 A1    Jan. 28, 2016

(30) Foreign Application Priority Data

Jul. 24, 2014   (JP) ................................. 2014-150753

(51) Int. Cl.
| B60N 2/64 | (2006.01) |
| A47C 27/14 | (2006.01) |
| B60N 2/70 | (2006.01) |

(52) U.S. Cl.
CPC ............ *B60N 2/646* (2013.01); *A47C 27/148* (2013.01); *B60N 2/70* (2013.01); *B60N 2/7017* (2013.01); *B60N 2/986* (2018.02)

(58) Field of Classification Search
CPC ........ B60N 2/646; B60N 2/70; B60N 2/7017; B60N 2/449; A47C 27/148; A47C 27/15
See application file for complete search history.

(56) References Cited

U.S. PATENT DOCUMENTS

| 4,379,856 A | * | 4/1983 | Samaritter | .......... B29C 44/0461 |
| | | | | 264/45.1 |
| 4,522,447 A | * | 6/1985 | Snyder | ................... A47C 7/022 |
| | | | | 297/452.27 |
| 4,837,881 A | | 6/1989 | Kondo et al. | |

(Continued)

FOREIGN PATENT DOCUMENTS

| FR | 2 942 423 A1 | 8/2010 |
| JP | 2006-149466 A | 6/2006 |
| JP | 2012-45104 A | 3/2012 |

OTHER PUBLICATIONS

European Search Report dated Dec. 11, 2015 issued in counterpart European Patent Application No. 15177962.6, (8 pages).

(Continued)

*Primary Examiner* — David R Dunn
*Assistant Examiner* — Tania Abraham
(74) *Attorney, Agent, or Firm* — Westerman, Hattori, Daniels & Adrian, LLP

(57) ABSTRACT

[Problem]
To provide a cushion pad that improves the holding property and reduces the wobbling feeling.
[Solution]
A force $S_{25}$ during compression to 25% in a first portion and a first side portion, which are positioned on a seating surface side, is set to a value smaller than the value of $S_{25}$ in a second portion and a second side portion, which are positioned on a bottom surface side. The first portion and the first side portion are positioned on the seating surface side of a thickness center. This allows ensuring a close contact property with the buttocks. The second portion and the second side portion are positioned on the bottom surface side of the thickness center. This allows improving the holding property of the buttocks and reducing the wobbling feeling.

7 Claims, 6 Drawing Sheets

(56) References Cited

U.S. PATENT DOCUMENTS

| | | | | |
|---|---|---|---|---|
| 5,544,942 A * | 8/1996 | Vu Khac | ............... | A47C 7/18 |
| | | | | 297/452.27 |
| 7,614,704 B2 * | 11/2009 | Whelan | ............... | A47C 7/021 |
| | | | | 297/452.25 |
| 7,661,764 B2 * | 2/2010 | Ali | ............... | B68G 7/05 |
| | | | | 297/452.26 |
| 7,891,260 B2 | 2/2011 | Hansen et al. | | |
| 2006/0273650 A1 | 12/2006 | Embach | | |
| 2009/0108494 A1 * | 4/2009 | Ito | ............... | A47C 7/022 |
| | | | | 264/258 |
| 2011/0043009 A1 | 2/2011 | Inayoshi et al. | | |
| 2012/0231203 A1 * | 9/2012 | Galbreath | ............... | B60N 2/70 |
| | | | | 428/68 |
| 2014/0001814 A1 * | 1/2014 | Fujita | ............... | A47C 27/22 |
| | | | | 297/452.48 |
| 2014/0210250 A1 * | 7/2014 | DiFelice | ............... | B60N 2/525 |
| | | | | 297/452.48 |
| 2016/0023584 A1 | 1/2016 | Nakada | | |
| 2016/0052435 A1 | 2/2016 | Nakada | | |
| 2016/0143442 A1 | 5/2016 | Nakada | | |

OTHER PUBLICATIONS

Office Action dated Apr. 1, 2017, issued in counterpart Chinese Application No. 201510412294.3, with English translation. (17 pages).

Non-Final Office Action dated Nov. 16, 2017, issued in U.S. Appl. No. 14/817,595 (24 pages).

Notification of Reasons for Refusal dated Jan. 30, 2018, issued in counterpart Japanese Application No. 2014-150753, with English translation. (11 pages).

* cited by examiner

CUSHION PAD

TECHNICAL FIELD

The present invention relates to a cushion pad, particularly, to a cushion pad that improves a holding property and reduces a wobbling feeling.

BACKGROUND ART

A cushion pad used for, for example, a seat and a chair such as furniture equipped with transportation means such as a vehicle, a ship, and an aircraft might provide wobbling feeling in the lateral direction to a seated person. For example, in a cushion pad mounted on a vehicle, a vibration input in a low frequency band (for example, approximately 1 Hz) when the vehicle travels around a gentle curve or changes the lane might deform the cushion pad so as to provide wobbling feeling such as side slipping and rolling around the roll axis. The wobbling feeling is a factor affecting the controllability and the stability. To reduce this wobbling feeling, there is a technology that sets tan δ with respect to the vibration in the low frequency band to a predetermined range (in Patent Literature 1).

CITATION LIST

Patent Literature

[Patent Literature 1] JP-A No. 2012-45104

SUMMARY OF INVENTION

Technical Problem

However, there is a request to further improve the holding property (the restraint property) relative to the above-described conventional technology.

The present invention has been made to respond to the above-described request, and it is an object of the present invention to provide a cushion pad that improves the holding property and reduces the wobbling feeling.

[Solution to Problem and Advantageous Effects of Invention]

To achieve this object, with the cushion pad according to a first aspect, a support portion has: a seating surface on which a seated person is seated; and a bottom surface on an opposite side to the seating surface. The support portion has a first portion whose hardness is set to a value smaller than a value of a hardness of a second portion. The first portion is positioned on the seating surface side of a thickness center as a center in a thickness direction sandwiched between the seating surface and the bottom surface. The second portion is a portion positioned on a vertical line passing through the first portion. The second portion is positioned on the bottom surface side of the thickness center. The first portion and the second portion are positioned in a center in a right-left direction viewed from the seated person seated on the seating surface. A first side portion has a hardness set to a value smaller than a value of a hardness of a second side portion. The first side portion is a portion positioned on a horizontal line passing through the first portion. The first side portion is positioned on an outer side of the first portion in the right-left direction. The second side portion is a portion on a vertical line passing through the first side portion. The second side portion is positioned on a horizontal line passing through the second portion. The hardness is a force during compression to 25% measured in compliance with E method specified in JIS K6400-2 (the 2012 edition) using a quadratic-prism-shaped test piece sampled by equally dividing the support portion.

The hardnesses of the first portion and the first side portion, which are positioned on the seating surface side, are set to the values smaller than the values of the hardnesses of the second portion and the second side portion, which are positioned on the bottom surface side. This allows providing soft feeling during seating to the seated person. Furthermore, the first portion and the first side portion are positioned on the seating surface side of the thickness center. This allows ensuring close contact property with the seated person. Furthermore, the second portion and the second side portion are positioned on the bottom surface side of the thickness center. This provides an effect that allows improving the holding property and reducing the wobbling feeling.

With the cushion pad according to a second aspect, a ratio of the hardness of the first side portion to the hardness of the first portion is set to a value smaller than a value of a ratio of the hardness of the second side portion to the hardness of the second portion. The first portion and the first side portion allow reducing the seat pressure of the seated person. In addition to the effect of the first aspect, this provides an effect that allows improving the soft feeling so as to ensure good seating comfort.

With the cushion pad according to a third aspect, the first side portion and the second side portion are positioned in the portions compressed by the seat pressure of the buttocks of the seated person. Normally, the ischial tuberosity portion of the seated person seated on the seating surface provides the largest seat pressure. However, the first side portion and the second side portion are positioned on the outer side in the right-left direction of the right and left ischial tuberosity portions of the seated person seated on the seating surface. This allows reducing the seat pressure in the portion providing the highest seat pressure in the buttocks of the seated person. Furthermore, the first side portion and the second side portion allow restraining the right and left ischial tuberosity portions from the outer side in the right-left direction. In addition to the effect of the second aspect, this provides an effect that allows improving the holding property of the buttocks so as to ensure good seating comfort while reducing the wobbling feeling.

With the cushion pad according to a fourth aspect, a hardness of a portion positioned in a center in the right-left direction of a bottom surface portion including the bottom surface is equal to or more than a hardness 1.1 times as large as a hardness of a portion positioned in a center in the right-left direction of a seating portion including the seating surface. Accordingly, in addition to the effect of the first aspect, this provides an effect that allows the bottom surface portion to support the buttocks and allows reducing sinking of the buttocks.

With the cushion pad according to a fifth aspect, a hardness of each portion positioned on a vertical line passing through the first portion and the second portion gradually increases from the seating surface side toward the bottom surface side. As a result, in addition to the effect of the first aspect, this provides an effect that allows obtaining soft feeling during seating on the seating surface side of the support portion and reducing sinking of the buttock on the bottom surface side of the support portion.

With the cushion pad according to a sixth aspect, a hardness of each portion positioned on a vertical line passing through the first side portion and the second side portion gradually increases from the seating surface side toward the bottom surface side. As a result, in addition to the effect of the first aspect, this provides an effect that allows obtaining soft feeling during seating on the seating surface side of the support portion and improving the holding property on the bottom surface side of the support portion.

With the cushion pad according to a seventh aspect, a hardness of each portion positioned on a horizontal line passing through the second portion gradually increases from the second portion toward an outer side in the right-left direction. As a result, in addition to the effect of the first aspect, this provides an effect that allows ensuring holding property of the buttocks of the seated person on the bottom surface side of the support portion so as to reduce the wobbling feeling.

With the cushion pad according to an eighth aspect, the support portion is integrally molded by a single foamed synthetic resin material. Hence, this allows eliminating the processes for burying an insert material having a large hardness and for laminating a plurality of layers having different hardnesses in the manufacturing process of the cushion pad. Accordingly, in addition to the effect of the first aspect, this provides an effect that allows saving the manufacturing cost.

DESCRIPTION OF EMBODIMENTS

Figure 1:
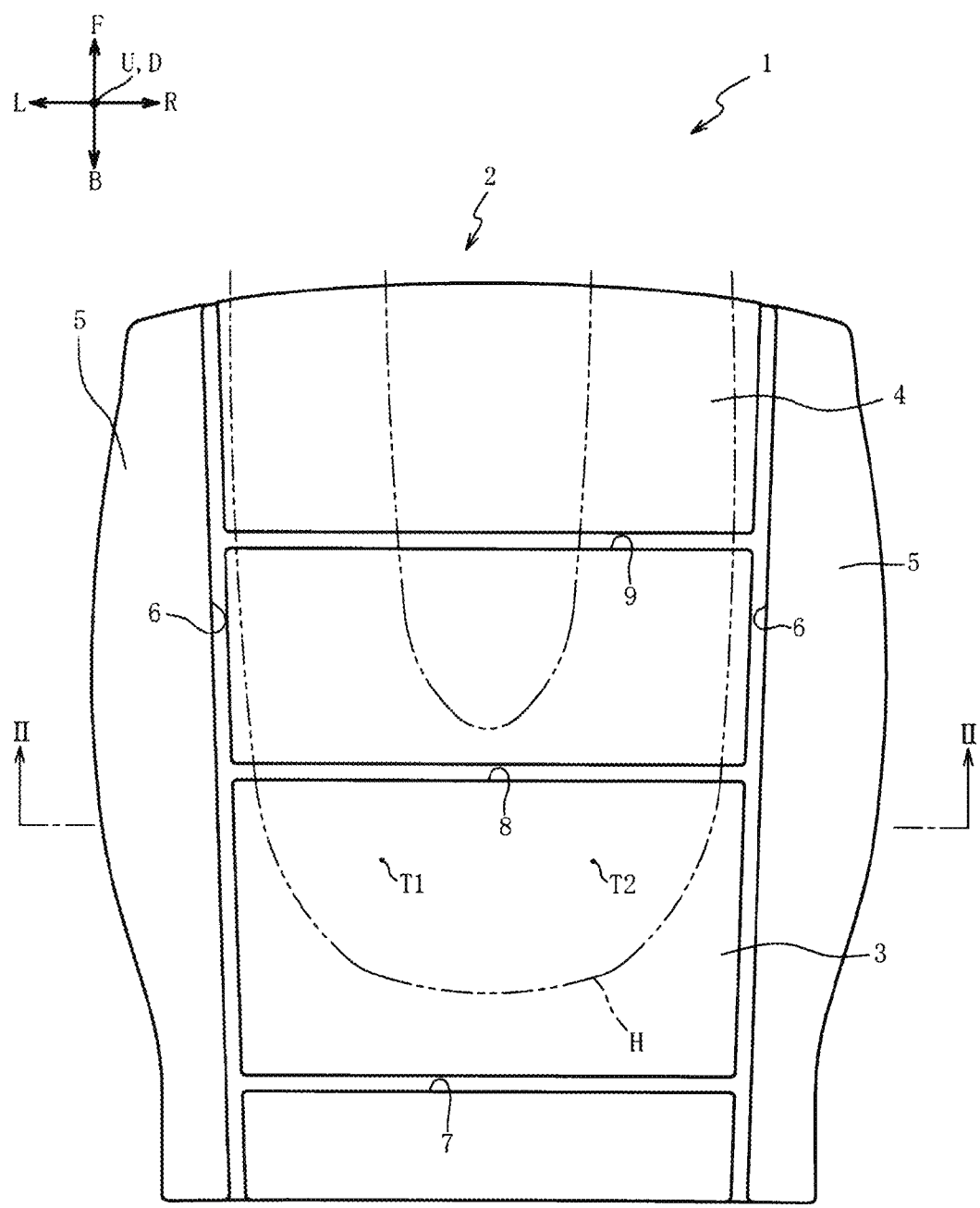
FIG. 1 is a plan view of a cushion pad according to a first embodiment of the present invention.

Hereinafter, a description will be given of preferred embodiments of the present invention with reference to the accompanying drawings. FIG. 1 is a plan view of a cushion pad 1 according to a first embodiment of the present invention. In this embodiment, a description will be given of the cushion pad 1 mounted on a vehicle (in particular, an automobile) having vibration. Note that, the respective arrows μ-D, L-R, and F-B in FIG. 1 denote the above-below direction, the right-left direction, and the front-rear direction of a vehicle (not shown) on which the cushion pad 1 is mounted (the same applies to FIG. 2 and FIG. 4).

As illustrated in FIG. 1, the cushion pad 1, which is a base material integrally molded with the flexible polyurethane foam (one type of foamed synthetic resin material), includes: a support portion 2, which supports the buttocks and the back side of the thigh of a seated person H; and side support portions 5, which are arranged on both sides of the support portion 2 in the right-left direction (the arrow L-R direction). The side support portions 5 are portions that support the side portions of the thigh and the buttocks.

The support portion 2 is partitioned by a lateral groove 8, which extends in the right-left direction, into: a rear support portion 3, which supports the buttocks; and a front support portion 4, which supports the back side of the thigh. The rear support portion 3 supports the buttocks including the right and left ischial tuberosity portions T1 and T2 of the seated person H in a seated state. In the rear support portion 3 and the front support portion 4, the respective lateral grooves 7 and 9 are depressed parallel to the lateral groove 8. In the boundary portion between the support portion 2 and the side support portion 5, a pair of longitudinal grooves 6, which extends in the front-rear direction (the arrow F-B direction) is formed. The pair of longitudinal grooves 6 couples to the respective both ends of the lateral grooves 7, 8, and 9. The longitudinal groove 6 and the lateral grooves 7, 8, and 9 are portions for pulling and securing a surface skin (not shown) such as fabric, artificial leather, or leather to the cushion pad 1.

Figure 2:
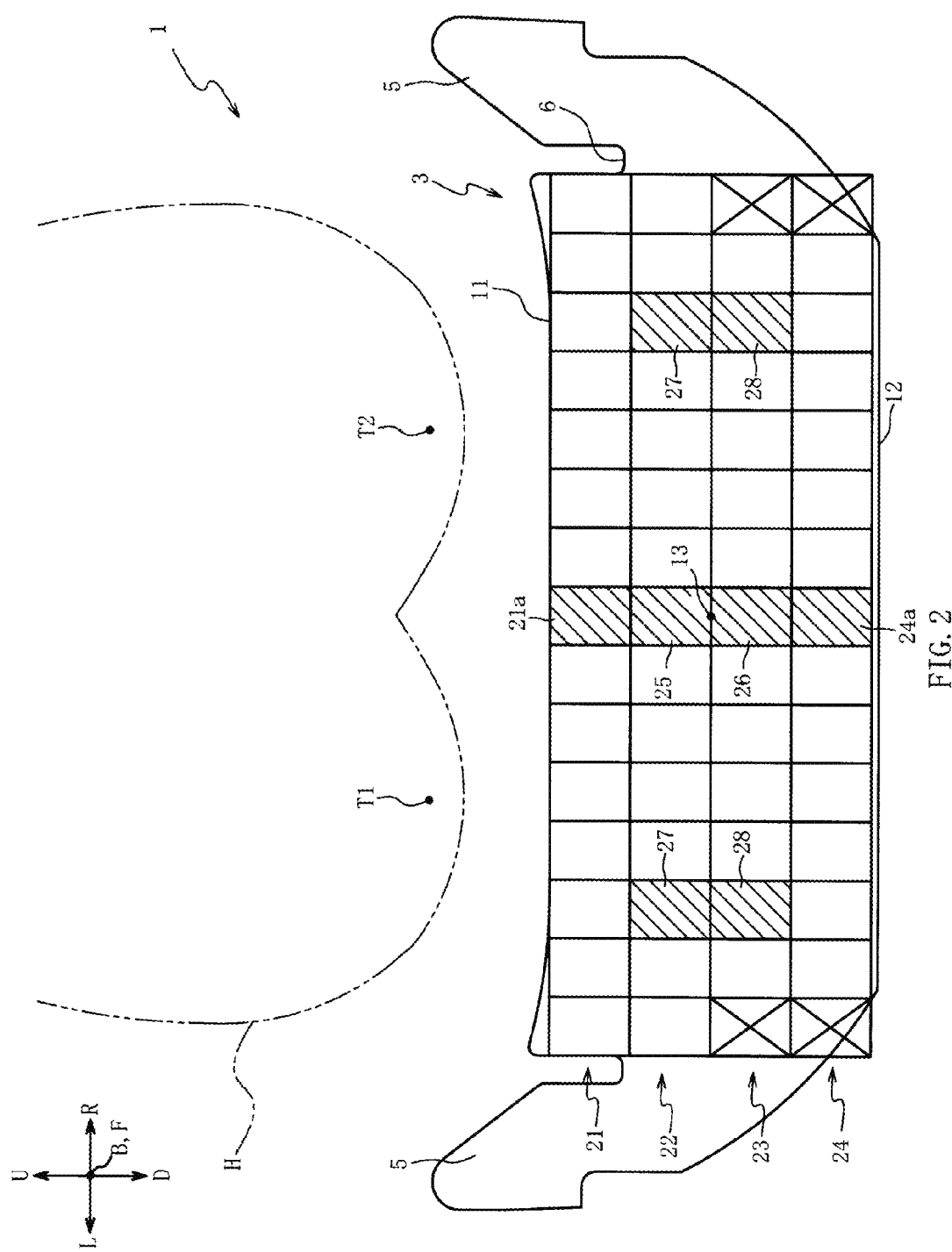
FIG. 2 is a schematic diagram where test pieces as an equally divided support portion are overlapped with a cross-sectional view of the cushion pad taken along the line II-II in FIG. 1.

The cushion pad 1 has a feature in the hardness distributions in the above-below direction (the arrow U-D the direction) and the right-left direction (the arrow L-R the direction) of the support portion 2 (the rear support portion 3). In this embodiment, a small test piece sampled from the rear support portion 3 (molded object) is used to measure the hardness so as to obtain the hardness distribution. Referring to FIG. 2, the sampling positions of the test piece will be described. FIG. 2 is a schematic diagram where the test pieces sampled by equally dividing the support portion 2 (the rear support portion 3) are overlapped with a cross-sectional view of the cushion pad 1 taken along the line II-II in FIG. 1.

As illustrated in FIG. 2, the rear support portion 3 is a portion formed on the inner side of the pair of longitudinal grooves 6 and 6 in the right-left direction, has a seating surface 11, on which the seated person H is seated, and a bottom surface 12 on the opposite side of the seating surface 11, and has a cross section formed in an approximately horizontally long rectangular shape. The rear support portion 3 is equally divided in the above-below direction (the arrow U-D direction) and the right-left direction (the arrow L-R direction) to measure the hardness. A plurality of test pieces is sampled.

In this embodiment, the rear support portion 3 in the above-below direction (the arrow U-D direction) is equally sectionalized into four layers (20 mm for each thickness). Those layers in the right-left direction (the arrow L-R direction) are equally sectionalized into 15 pieces (20 mm for each width). In the respective layers, the lengths in the front-rear direction (the perpendicular direction on the paper in FIG. 2) are set to 20 mm to sample 60 test pieces in a quadrangular prism shape (cube) having 20 mm for each side. The four layers formed by equally dividing the rear support portion 3 into four portions in the above-below direction (the arrow U-D direction) are: a seating portion 21 including the seating surface 11; an upper center portion 22 positioned under the seating portion 21; a lower center portion 23 positioned under the upper center portion 22; and a bottom surface portion 24, which is positioned under the lower center portion 23 and includes the bottom surface 12. The seating portion 21 and the upper center portion 22 are positioned on the seating surface 11 side of a thickness center 13 as the center of the rear support portion 3 in the thickness direction. The lower center portion 23 and the bottom surface portion 24 are positioned on the bottom surface 12 side of the thickness center 13.

For the sampled test piece, the force during compression to 25% is measured in compliance with E method specified in JIS K6400-2 (the 2012 edition). JIS K6400-2 is Japanese Industrial Standards made by based on ISO 2439 (Fourth Edition: issued in 2008), ISO 3386-1 (Second Edition:

issued in 1986), and ISO 3386-2 (Second Edition: issued in 1997). According to this testing method, the test piece placed on a support plate (not shown) larger than the test piece while facing the above-below direction (the arrow U-D direction) is pre-compressed by a pressure plate (not shown) having a pressure surface larger than the top surface of the test piece, and then is pressurized to have 75±2.5% of the thickness. The force when the test piece is pressurized to have 25±1% of the thickness is assumed to be a force $S_{25}$ (unit: N) under compression of the test piece to 25%. In this description, the force (hereinafter referred to as "$S_{25}$") during compression to 25% is defined as "hardness."

It is to be noted that, the test piece sampled from the bottom surface portion 24 is placed on a support plate (not shown) side while facing the bottom surface 12 side after a reinforced fabric (not shown) molded integrally with the bottom surface 12 is removed. Then, the hardness is measured. This is for reducing the influence of the reinforced fabric. Furthermore, the test pieces (to which "cross" is attached in FIG. 2) sampled from both ends of the lower center portion 23 and the bottom surface portion 24 in the right-left direction have hardnesses larger than the hardnesses of the other test pieces, and thus are eliminated.

Furthermore, for convenience, the portion that is: the portion positioned in the center in the right-left direction (the arrow L-R direction) of the rear support portion 3; and the portion (the test piece) positioned on the seating surface 11 side of the thickness center 13, is referred to as a first portion 25. The portion that is: the portion positioned on the vertical line (the straight line in the arrow U-D direction) passing through the first portion 25; and the portion (the test piece) positioned on the bottom surface 12 side of the thickness center 13, is referred to as a second portion 26. The portion that is: the portion positioned on the horizontal line (the straight line in the arrow L-R direction) passing through the first portion 25 (within the upper center portion 22); and the portion (the test piece) positioned on the outer side of the first portion 25 in the right-left direction, is referred to as a first side portion 27. The portion that is: the portion on the vertical line passing through the first side portion 27; and the portion (the test piece) positioned on the bottom surface 12 side of the thickness center 13, is referred to as a second side portion 28. The portion (the test piece) positioned in the center of the seating portion 21 in the right-left direction is referred to as a seating center portion 21a. The portion (the test piece) positioned in the center of the bottom surface portion 24 in the right-left direction is referred to as a bottom center portion 24a.

Figure 3:
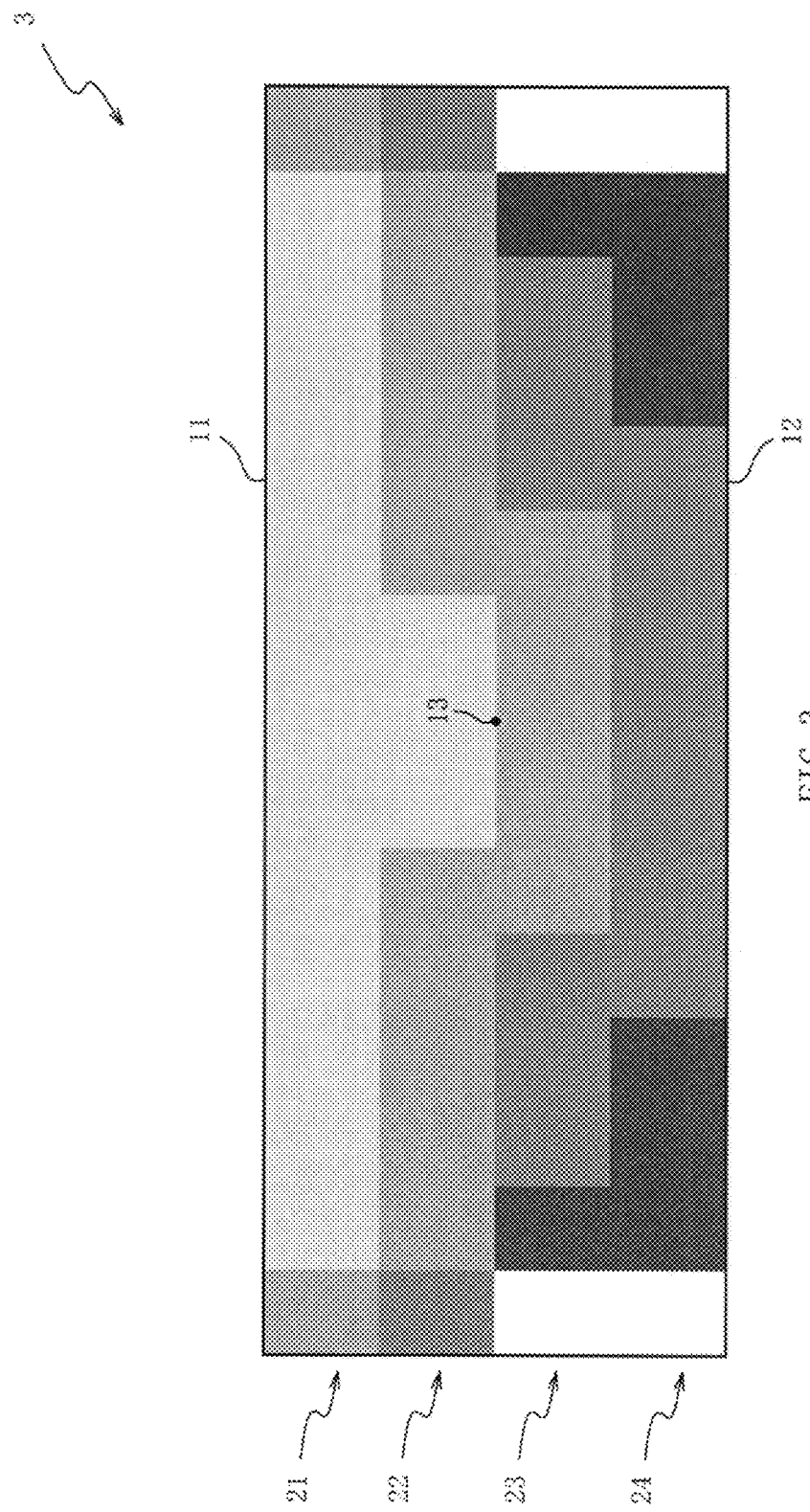
FIG. 3 is a diagram illustrating a hardness distribution of a support portion.

Referring to FIG. 3, the following describes the hardness distribution of the support portion 2 (the rear support portion 3) based on $S_{25}$ (the measured values of the respective test pieces). FIG. 3 is a diagram illustrating the hardness distribution of the support portion. Note that, in FIG. 3, the values (unit: N/cm²) obtained by dividing the hardnesses (unit: N) of the respective test pieces by the cross-sectional areas (unit: cm²) of the test pieces are divided into four sections. These sections are displayed by four levels of shadings. FIG. 3 illustrates the state where a darker color indicates a larger hardness.

As illustrated in FIG. 3, the rear support portion 3 is formed to have a larger hardness in the order corresponding to the seating portion 21, the upper center portion 22, the lower center portion 23, and the bottom surface portion 24. Furthermore, the upper center portion 22, the lower center portion 23, and the bottom surface portion 24 are formed such that the hardness increases toward the outer side of the center in the right-left direction. As a result, the rear support portion 3 has the hardness increasing from the seating surface 11 toward the bottom surface 12, and has a mortar-shaped hardness distribution where the hardness on the outer side of the center in the right-left direction increases.

Figure 4:
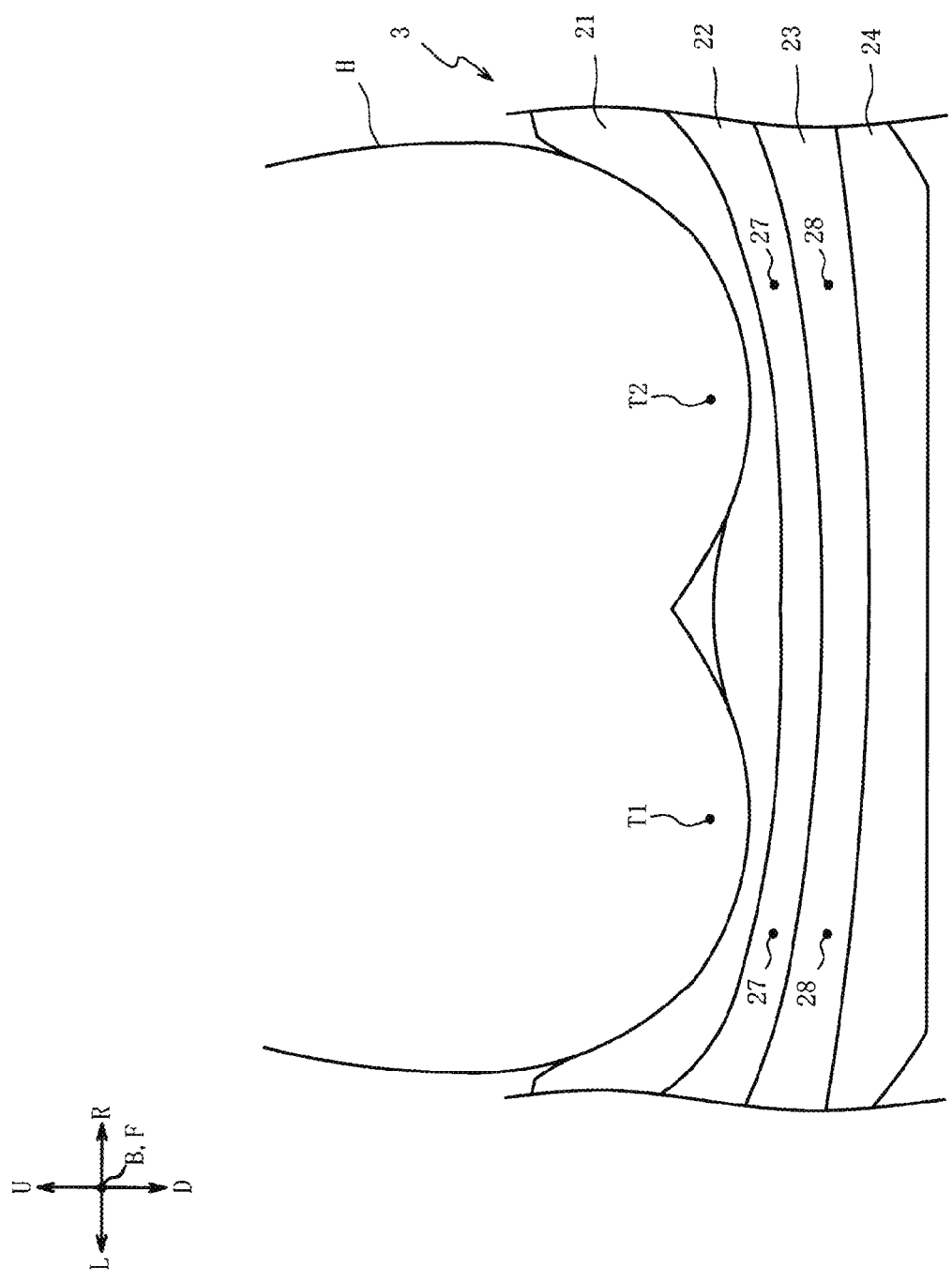
FIG. 4 is a schematic diagram of the cushion pad illustrating the seated state of a seated person.

The following describes the cushion pad 1 on which the seated person H is seated by referring to FIG. 4. FIG. 4 is a schematic diagram of the cushion pad 1 illustrating the seated state of the seated person H. Note that, in FIG. 4, the illustration of the side support portion 5 is omitted.

As illustrated in FIG. 4, when the seated person H is seated on the cushion pad 1 (the rear support portion 3), the rear support portion 3 is compressed in the above-below direction (the arrow U-D direction) by the weight of this seated person H. The rear support portion 3 is set to increase in hardness from the seating surface 11 toward the bottom surface 12 (see FIG. 3). This allows providing close contact feeling (fit feeling) with the buttocks while providing soft feeling mainly by the seating portion 21 and the upper center portion 22. Furthermore, the seating portion 21, the upper center portion 22, the lower center portion 23, and the bottom surface portion 24 deform to ensure the holding property (the restraint property) of the buttocks in the right-left direction (the arrow L-R direction) so as to reduce the wobbling feeling.

In particular, the rear support portion 3 has the mortar-shaped hardness distribution where the upper center portion 22, the lower center portion 23, and the bottom surface portion 24 have the larger hardnesses on the outer side in the right-left direction relative to the center in the right-left direction. This allows improving the holding property of the buttocks.

Note that, as illustrated in FIG. 4, the first side portion 27 and the second side portion 28 are the portions compressed in the above-below direction by the seat pressure of the buttocks of the seated person H and are positioned on the outer side in the right-left direction (the arrow L-R direction) with respect to the right and left ischial tuberosity portions T1 and T2 of the seated person H in a seated state.

Figure 5A:
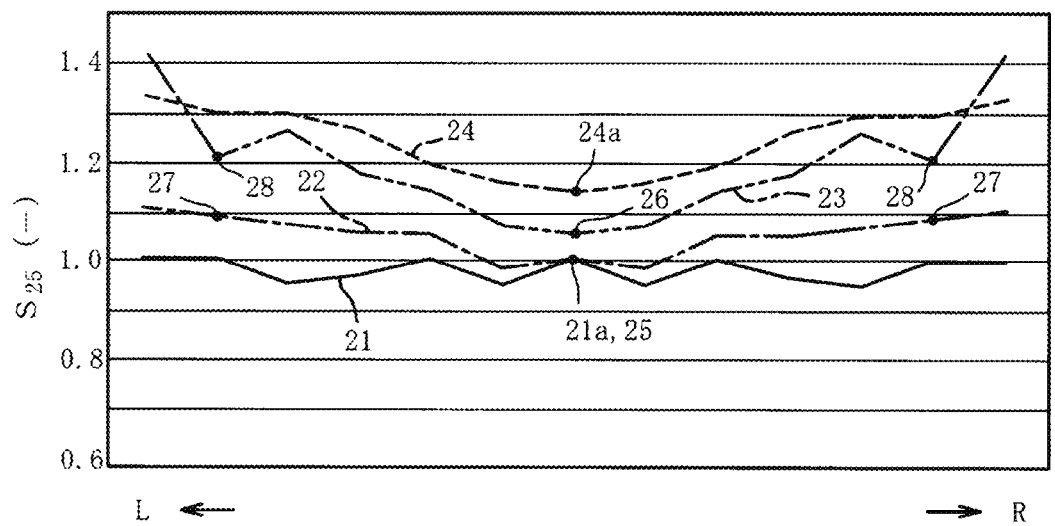
FIG. 5A is a graph illustrating the hardness of the cushion pad.

The following the hardness distribution of the cushion pad 1 (the rear support portion 3) by referring to FIG. 5A in detail. FIG. 5A is a graph illustrating the hardness of the cushion pad 1 (the rear support portion 3). In FIG. 5A, $S_{25}$ (the ratio of the seating center portion 21a to the hardness) of the respective test pieces are plotted when the force $S_{25}$ during compression to 25% of the seating center portion 21a (the portion in the center of the seating portion 21 in the right-left direction) is set to 1. In FIG. 5A, the horizontal axis (the X-axis) denotes the sampling positions of the respective test pieces in the right-left direction in the rear support portion 3. The vertical axis (the Y-axis) denotes $S_{25}$ (the ratio). The solid line denotes $S_{25}$ of the respective test pieces in the seating portion 21. The one dot chain line denotes $S_{25}$ of the respective test pieces in the upper center portion 22. The two-dot chain line denotes $S_{25}$ of the respective test pieces in the lower center portion 23. The dashed line denotes $S_{25}$ of the respective test pieces in the bottom surface portion 24.

Note that, in FIG. 5A, the hardnesses of the test pieces sampled from both the ends of the seating portion 21, the upper center portion 22, the lower center portion 23, and the bottom surface portion 24 in the right-left direction are not plotted. This is because these hardnesses are larger than the hardnesses of the other test pieces.

As illustrated in FIG. 5A, the seating portion 21 has an approximately constant hardness over the right-left direction. In contrast, the upper center portion 22, the lower center portion 23, and the bottom surface portion 24 have hardness gradients where the hardnesses gradually increase toward the outer side in the right-left direction. Compared with the hardness gradient of the upper center portion 22, the hardness gradients of the lower center portion 23 and the bottom surface portion 24 are set to be large. This allows providing a comfortable holding property to the seated person H.

Furthermore, the hardness of the first portion 25 positioned on the seating surface 11 side of the thickness center 13 (see FIG. 2) is set to a value smaller than the value of the hardness of the second portion 26 positioned on the bottom surface 12 side of the thickness center 13. The hardness of the first side portion 27 is set to a value smaller than the value of the hardness of the second side portion 28. The hardnesses of the first portion 25 and the first side portion 27, which are positioned on the seating surface 11 side, are set to values smaller than the values of the hardnesses of the second portion 26 and the second side portion 28, which are positioned on the bottom surface 12 side. This allows providing the soft feeling during seating to the seated person H. Furthermore, the first portion 25 and the first side portion 27 are positioned on the seating surface 11 side of the thickness center 13. This allows ensuring a close contact property with the buttocks. Furthermore, the second portion 26 and the second side portion 28 are positioned on the bottom surface 12 side of the thickness center 13. This allows improving the holding property of the buttocks and reducing the wobbling feeling.

The ratio of the hardness of the first side portion 27 to the hardness of the first portion 25 is set to a value smaller than the value of the ratio of the hardness of the second side portion 28 to the hardness of the second portion 26. As a result, the first portion 25 and the first side portion 27 allow reducing the seat pressure, thus improving the soft feeling and enhancing the seating comfort.

The first side portion 27 and the second side portion 28 (see FIG. 4) are positioned in the portion compressed in the above-below direction (the arrow U-D direction) by the seat pressure of the seated person H. Normally, the ischial tuberosity portions T1 and T2 of the seated person H seated on the seating surface 11 provide the highest seat pressure. However, the first side portion 27 and the second side portion 28 are positioned on the outer side in the right-left direction with respect to the right and left ischial tuberosity portions T1 and T2 of the seated person H seated on the seating surface 11. This allows reducing the seat pressure in the portion providing the highest seat pressure. Furthermore, the right and left ischial tuberosity portions T1 and T2 can be restrained by the first side portion 27 and the second side portion 28 from the outer side in the right-left direction. This allows improving the holding property of the buttocks so as to ensure good seating comfort while reducing the wobbling feeling.

Here, the hardness of the bottom center portion 24a positioned in the center of the bottom surface portion 24 in the right-left direction is set to be equal to or more than a hardness 1.1 times as large as the hardness of the seating center portion 21a positioned in the center of the seating portion 21 in the right-left direction. This allows the bottom surface portion 24 to firmly support the buttocks so as to reduce sinking of the buttocks. It is to be noted that, the hardness of the bottom center portion 24a is set to be equal to or less than a hardness twice as large as, preferably, equal to or less than a hardness 1.5 times as large as the hardness of the seating center portion 21a. This is because the excessively hard bottom center portion 24a provides poor seating comfort.

As illustrated in FIG. 5A, the hardnesses in the respective portions positioned on the vertical line passing through the first portion 25 and the second portion 26 (on the straight line parallel to the Y-axis) gradually increase in the order corresponding to the seating portion 21 (the upper center portion 22), the lower center portion 23, and the bottom surface portion 24. This consequently allows obtaining the soft feeling during seating on the seating surface 11 (see FIG. 2) side and reducing sinking of the buttocks on the bottom surface 12 side.

Furthermore, the hardnesses in the respective portions positioned on the vertical line passing through the first side portion 27 and the second side portion 28 (on the straight line parallel to the Y-axis) gradually increase in the order corresponding to the seating portion 21, the upper center portion 22, the lower center portion 23, and the bottom surface portion 24. This consequently allows obtaining the soft feeling during seating on the seating surface 11 side and improving the holding property of the buttocks on the bottom surface 12 side.

The hardnesses (the hardnesses of the respective test pieces in the lower center portion 23) in the respective portions positioned on the horizontal line passing through the second portion 26 gradually increase from the second portion 26 toward the outer side in the right-left direction. This consequently allows ensuring holding property of the buttocks of the seated person H on the bottom surface 12 side (the lower center portion 23) of the rear support portion 3 so as to reduce the wobbling feeling.

It is to be noted that, the rear support portion 3 is integrally molded by the single foamed synthetic resin material. This allows eliminating the processes for burying an insert material having a large hardness and for laminating a plurality of layers having different hardnesses in the manufacturing process of the cushion pad. This allows saving the manufacturing cost of the cushion pad 1.

The following describes a method for manufacturing the cushion pad 1. The cushion pad 1 is manufactured by injecting a compound liquid (foamable raw liquid) containing a polyol component, a polyisocyanate component, a foaming agent, and a catalyst to a molding die (the lower die) and foam molding inside the molding die (the lower die and the upper die). It is to be noted that, the cushion pad 1 can be molded integrally with the bottom surface 12 by preliminarily attaching a reinforced fabric such as coarse wool cloth and nonwoven fabric on the molding die (the upper die). Furthermore, after the cushion pad 1 is molded, a reinforced fabric can be bonded to the bottom surface 12.

The polyol component can employ polyetherpolyol, polyester polyol, polycarbonate polyol, polyolefin polyol, and lactone-based polyol. One kind or the mixture of two or more kinds of these components can be used. Among these, polyetherpolyol is preferred because the raw material cost is low and the water resistance is excellent.

As necessary, polymer polyol can be used in combination. Polymer polyol employs, for example, material obtained by graft-copolymerizing a polymer component such as polyacrylonitrile and acrylonitrile-styrene copolymer to polyetherpolyol containing polyalkylene oxide.

The weight average molecular weight of the polyol component is preferred to be 6000 to 10000. In the case where the weight average molecular weight is less than 6000, the flexibility of the obtained foam is lost such that degradation in physical property or a decrease in elastic performance is likely to occur. In the case where the weight average molecular weight exceeds 10000, the hardness of the foam is likely to decrease.

The polyisocyanate component can employ publicly-known various polyfunctional aliphatic, alicyclic, and aromatic isocyanates. For example, tolylene diisocyanate (TDI), methylene diphenyl diisocyanate (MDI), dicyclohexylmethane diisocyanate, triphenyl diisocyanate, xylene diisocyanate, polymethylene polyphenylene polyisocyanate, hexamethylene diisocyanate, isophorone diisocyanate, ortho-toluidine diisocyanate, naphthylene diisocyanate, xylylene diisocyanate, lysine diisocyanate, and similar component can be employed. Among these, one kind may be used alone or two or more kinds may be used in combination.

MDI-based isocyanates typified by methylene diphenyl diisocyanate include, for example, methylene diphenyl diisocyanate (pure MDI), polyphenylene polymethylene polyisocyanate (polymeric MDI), polymeric body of these, urethane-modified body of these, urea-modified body, allophanate-modified body, biuret modified body, carbodiimide-modified body, uretonimine-modified body, uretdione-modified body, isocyanurate-modified body, and the mixture of two or more kinds of these.

Furthermore, terminal isocyanate prepolymer can also be used. Terminal isocyanate prepolymer is obtained by preliminarily causing a reaction of: polyol such as polyetherpolyol and polyester polyol; and polyisocyanate (such as TDI-based isocyanate and MDI-based isocyanate). Use of terminal isocyanate prepolymer allows controlling the viscosity of the compound liquid (foamable raw liquid), the primary structure of polymer, the compatibility, and it is preferable.

In this embodiment, the polyisocyanate component preferably employs MDI-based isocyanate, which allows molding an elastic foam having a small rebound resilience compared with the elastic foam by TDI-based isocyanate. In the case where the mixture of MDI-based isocyanate and TDI-based isocyanate is used, the mass ratio is set to MDI-based material:TDI-based material=100:0 to 75:25, preferably, 100:0 to 80:20. As the mass ratio of the TDI-based material in the polyisocyanate component becomes larger than 20/100, the wobbling feeling in the obtained product tends to decrease. When the mass ratio of the TDI-based material becomes larger than 25/100, this trend becomes remarkable. It is to be noted that, the isocyanate index (the percentage of the equivalence ratio of the isocyanate group to the active hydrogen group) of the polyisocyanate component is set to, for example, 85 to 130.

The foaming agent mainly employs water. As necessary, molding can also be performed by concomitantly using a small amount of a low boiling point organic compound such as cyclopentane, normal pentane, isopentane, and HFC-245fa or using a gas loading device so as to mix and dissolve air, nitrogen gas, liquefied carbon dioxide, or similar material in the raw liquid. The preferred addition amount of the foaming agent depends on the set density of the obtained product, but is normally 0.5 to 15 mass % with respect to the polyol component.

The catalyst can employ various urethane catalysts that are publicly-known in this field. For example, reactive amine such as triethylamine, tripropylamine, tributylamine, N-methylmorphiline, N-ethylmorpholine, dimethylbenzylamine, N,N,N',N'-tetramethylhexamethylenediamine, N,N,N',N',N''-pentamethyldiethylenetriamine, and bis-(2-dimethylaminoethyl) ether, or organic acid salt of these; metal carboxylate such as potassium acetate and potassium octoate, or an organic metal compound such as stannous octoate, dibutyl tin dilaurate, and zinc naphthenate can be employed. Furthermore, an amine catalyst having an active hydrogen group such as N,N-dimethylethanolamine and N,N-diethylethanolamine is also preferred. The preferred addition amount of the catalyst is 0.01 to 10 mass % with respect to the polyol component.

As necessary, a polyvalent active hydrogen compound having a low molecular weight is used as a crosslinking agent. The crosslinking agent facilitates the adjustment of the spring property of the cushion pad. The crosslinking agent employs, for example: polyhydric alcohols such as ethylene glycol, propylene glycol, 1,4-butanediol, trimethylolpropane, and glycerin; a compound obtained by polymerizing ethylene oxide or propylene oxide using these polyhydric alcohols as an initiator; and alkanolamines such as monoethanolamine, diethanolamine, triethanolamine, and N-methyldiethanolamine. These compounds can be used alone or as the mixture of two or more kinds.

Furthermore, a foam stabilizer is used as necessary. The foam stabilizer can employ an organic silicon-based surfactant that is publicly-known in this field. The preferred addition amount of the foam stabilizer is 0.1 to 10 mass % with respect to the polyol component. Further, as necessary, a flame retardant, a plasticizer, a cell opener, an oxidation inhibitor, an ultraviolet absorber, a colorant, various fillers, an internal mold release agent, or other process aids are used.

The following describes the present invention for more details using Examples. However, the present invention is not limited to these Examples. The compositions of the compound liquid (foamable raw liquid) for molding the cushion pad in Examples and Comparative examples are shown in Table 1. The numerical value shown in Table 1 denotes the unit mass (mass ratio). Furthermore, the isocyanate amount in Table 1 is the mass ratio of isocyanate to polyol (to 100 of polyol). Isocyanates 1 to 3 are the component ratios to the entire isocyanate.

TABLE 1

|  |  | Example 1 | Example 2 | Example 3 | Example 4 | Comparative example 1 | Comparative example 2 | Comparative example 3 |
|---|---|---|---|---|---|---|---|---|
| polyol | 1 | 80 | 80 | 80 | 80 |  |  |  |
|  | 2 |  |  |  |  | 60 | 60 | 60 |
|  | 3 | 20 | 20 | 20 | 20 | 40 | 40 | 40 |
| crosslinking | 1 | 1.0 | 1.0 | 1.0 | 1.0 | 1.5 | 1.5 | 1.5 |
| agent | 2 |  |  |  |  | 2.5 | 2.5 | 2.5 |
| cell opener |  | 2.0 | 2.0 | 2.0 | 2.0 |  |  |  |
| foam | 1 | 1.0 | 1.0 | 1.0 | 1.0 |  |  |  |
| stabilizer | 2 |  |  |  |  | 1.0 | 1.0 | 1.0 |
| catalyst | 1 | 0.45 | 0.45 | 0.45 | 0.45 | 0.40 | 0.40 | 0.40 |
|  | 2 | 0.05 | 0.05 | 0.05 | 0.05 | 0.05 | 0.05 | 0.05 |
| water |  | 2.9 | 2.9 | 2.9 | 2.9 | 2.5 | 2.5 | 2.5 |

TABLE 1-continued

|  |  | Example 1 | Example 2 | Example 3 | Example 4 | Comparative example 1 | Comparative example 2 | Comparative example 3 |
|---|---|---|---|---|---|---|---|---|
| isocyanate amount |  | 49.9 | 49.9 | 49.9 | 49.9 | 37.1 | 38.1 | 35.6 |
| isocyanate | 1 |  |  | 5 | 15 | 25 | 80 | 70 | 60 |
|  | 2 | 100 | 95 | 85 | 75 |  |  |  |
|  | 3 |  |  |  |  | 20 | 30 | 40 |
| wobbling feeling |  | Excellent | Excellent | Excellent | Good | Poor | Poor | Poor |

Furthermore, the respective components described on Table 1 are as follows.
polyol 1: polyetherpolyol EP828 (made by Mitsui Chemicals, Inc.), weight average molecular weight 6000
polyol 2: polyetherpolyol EP330N (made by Mitsui Chemicals, Inc.), weight average molecular weight 5000
polyol 3: polymer polyol POP3623 (made by Mitsui Chemicals, Inc.)
crosslinking agent 1: diethanolamine
crosslinking agent 2: EL980 (made by ASAHI GLASS CO., LTD.)
cell opener: EP505S (made by Mitsui Chemicals, Inc.)
foam stabilizer 1: SZ1336 (made by Dow Corning Toray Co., Ltd.)
foam stabilizer 2: SZ1325 (made by Dow Corning Toray Co., Ltd.)
catalyst 1: TEDA L33 (made by TOSOH CORPORATION)
catalyst 2: ToyocatET (made by TOSOH CORPORATION)
isocyanate 1: tolylene diisocyanate TDI-80 (made by Mitsui Chemicals, Inc.)
isocyanate 2: polymeric MDI 2,4'-MDI.4,4'-mixture of MDI
isocyanate 3: polymeric MDI MR200 (made by Nippon Polyurethane Industry Co., Ltd (TOSOH CORPORATION)))

Respective these components were combined by an ordinary method using the mass ratios shown in Table 1 so as to be uniformly mixed. Subsequently, a predetermined amount of the mixture was injected to the molding die (the lower die) for a cushion pad in a predetermined shape and was foamed and hardened inside the cavity so as to obtain cushion pads in Examples 1 to 4 and Comparative examples 1 to 3. For all the cushion pads, wobbling feeling was evaluated by a sensory test when an examinee was seated. The evaluation of the wobbling feeling was ranked in three levels, which is Excellent: considerably excellent with small wobbling feeling, Good, and Poor: large wobbling feeling, and the result was shown in Table 1.

Figure 5B:
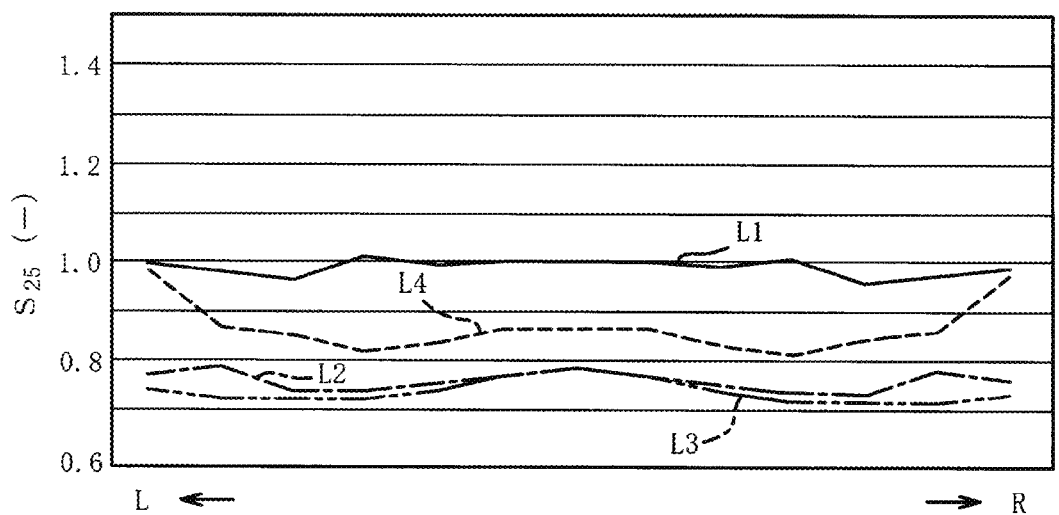
FIG. 5B is a graph illustrating the hardness of a cushion pad in a comparative example.

Furthermore, for the cushion pads in Example 3 and Comparative example 1, the rear support portion was equally sectionalized to sample 60 test pieces (in a quadrangular shape having the size of 20 mm in length, 20 mm in width, and 20 mm in height) (see FIG. 2). The force $S_{25}$ during compression to 25% was measured in compliance with E method specified in JIS K6400-2 (the 2012 edition). FIG. 3 and FIG. 5A are diagrams illustrating the hardness of the cushion pad in Example 3. FIG. 5B is a graph illustrating the hardness of the cushion pad in Comparative example 1. Similarly to the cushion pad 1 in the Examples, the cushion pad in Comparative example 1 has a seating portion L1, an upper center portion L2, a lower center portion L3, and a bottom surface portion L4 from the seating surface, on which the seated person H is seated, toward the bottom surface. The seating portion L1 is a portion in contact with the lower die of the molding die. The bottom surface L4 is a portion in contact with the upper die of the molding die.

Similarly to FIG. 5A, FIG. 5B is a graph illustrating the plot of $S_{25}$ of the respective test pieces when $S_{25}$ in the center portion in the right-left direction of the seating portion L1 is set to 1. In FIG. 5B, the horizontal axis (the X-axis) denotes the sampling positions in the right-left direction of the respective test pieces in the rear support portion, and the vertical axis (the Y-axis) denotes $S_{25}$ (by ratio). The solid line denotes $S_{25}$ of the respective test pieces in the seating portion L1. The one dot chain line denotes $S_{25}$ of the respective test pieces in the upper center portion L2. The two-dot chain line denotes $S_{25}$ of the respective test pieces in the lower center portion L3. The dashed line denotes $S_{25}$ of the respective test pieces in the bottom surface portion L4.

As illustrated in FIG. 5B, the cushion pad in Comparative example 1 was found to have the largest hardness in the seating portion L1 and the second largest hardness in the bottom surface portion L4. Furthermore, the upper center portion L2 and the lower center portion L3 were found to have hardnesses smaller than those hardnesses. Furthermore, it was found that the bottom surface portion L4 had a slightly larger hardness on the outer side in the right-left direction than the hardness in the center in the right-left direction while the seating portion L1, the upper center portion L2, and the lower center portion L3 had approximately constant hardnesses over the right-left direction. It is inferred that the cushion pad in Comparative example 1 provides poor fit feeling due to the hardest seating portion L1 and further provides wobbling feeling in the lateral direction to the seated person due to the hard seating portion L1 and bottom surface portion L4 (the surface layer) and the soft upper center portion L2 and lower center portion L3 (the core layer).

In contrast, it is inferred that, as illustrated in FIG. 5A, the cushion pad in Example 3 is set to have the softest seating portion 21 and become harder in the order corresponding to the upper center portion 22, the lower center portion 23, and the bottom surface portion 24 so as to be excellent in fit feeling and is causes firmly supporting by the upper center portion 22, the lower center portion 23, and the bottom surface portion 24 so as to reduce the wobbling feeling. Furthermore, it is inferred that the upper center portion 22, the lower center portion 23, and the bottom surface portion 24 allow improving the holding property due to the larger hardness on the outer side in the right-left direction than the hardness in the center in the right-left direction.

Figure 6:
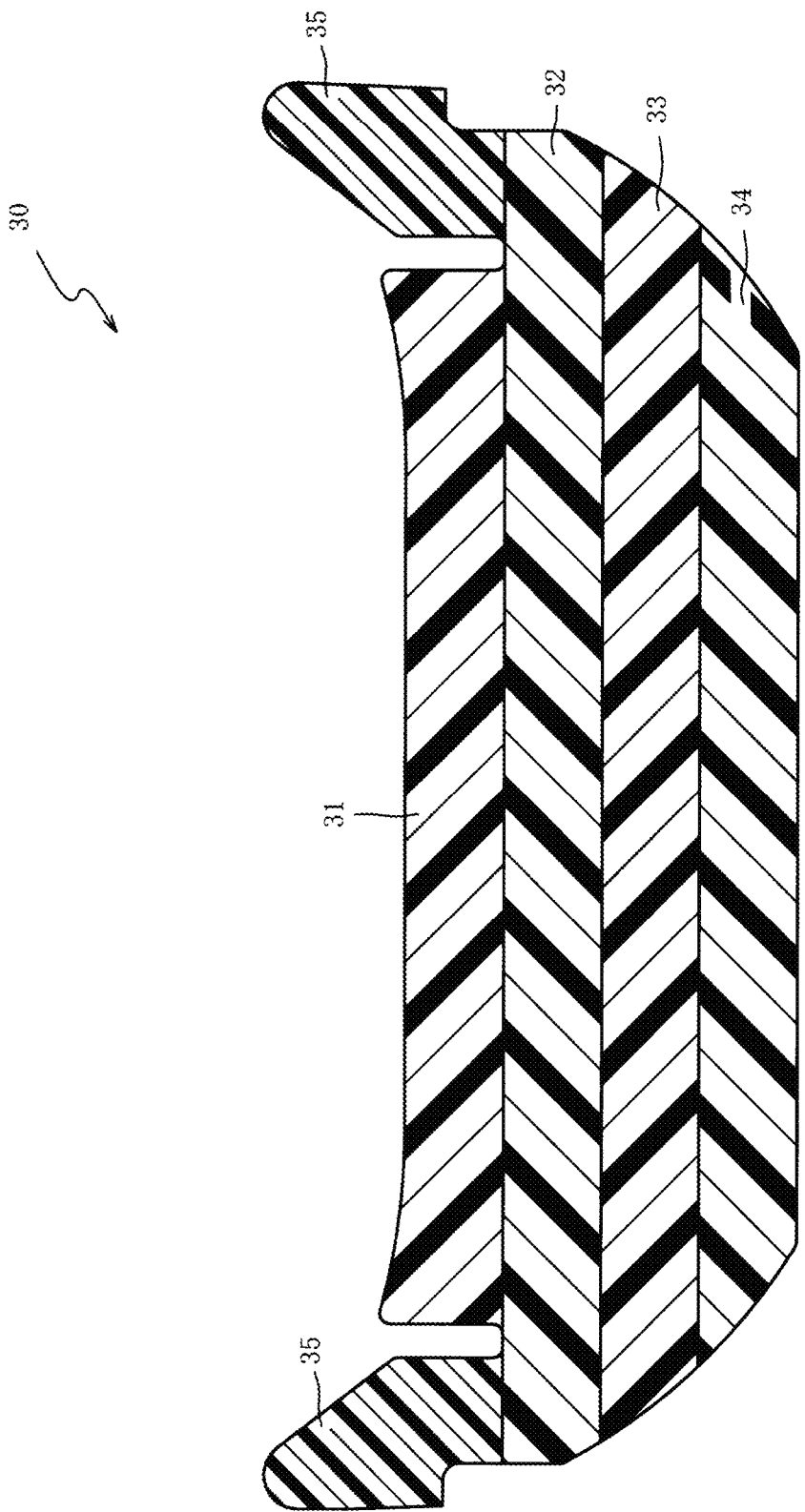
FIG. 6 is a cross-sectional view of a cushion pad according to a second embodiment.

Referring to FIG. 6, the following describes a second embodiment. In the first embodiment, the cushion pad integrally formed with the flexible polyurethane foam has been described. In contrast, in the second embodiment, a description will be given of a cushion pad formed by laminating a plurality of layered members. FIG. 6 is a cross-sectional view of a cushion pad 30 according to the second embodiment.

As illustrated in FIG. 6, the cushion pad 30 includes: a seating portion 31, on which the seated person is seated; an upper center portion 32, which is arranged under the seating portion 31; a lower center portion 33, which is arranged under the upper center portion 32; and a bottom surface portion 34, which is arranged under the lower center portion 33. On the outer side of the seating portion 31 in the right-left direction, a side support portions 35 are arranged. The seating portion 31, the upper center portion 32, the lower center portion 33, and the bottom surface portion 34 are bonded to one another to be laminated. The side support portions 35 are bonded to both right and left sides of the upper center portion 32.

For the seating portion 31, the upper center portion 32, the lower center portion 33, and the bottom surface portion 34, the materials are selected such that the force $S_{25}$ during compression to 25% increases in this order. In this embodiment, the seating portion 31, the upper center portion 32, the lower center portion 33, and the bottom surface portion 34 are all formed in a tabular shape using flexible polyurethane foam (molded urethane). The hardness distributions of the seating portion 31, the upper center portion 32, the lower center portion 33, and the bottom surface portion 34 are set similarly to the hardness distributions in the cushion pad 1 (the rear support portion 3) according to the first embodiment. Therefore, the description of these is omitted. The cushion pad 30 in the second embodiment allows achieving the operation and effect similar to those of the cushion pad 1 in the first embodiment.

As described above, the present invention has been described based on the above-mentioned embodiments. It will be appreciated that the present invention will not be limited to the embodiments described above, but various modifications are possible without departing from the technical scope of the present invention. For example, the shapes described in the above-mentioned embodiments are examples. Other shapes are obviously possible.

While in the above-described respective embodiments the cushion pads 1 and 30 to be mounted on a vehicle (automobile) have been described, this should not necessarily be construed in a limiting sense. The cushion pads 1 and 30 may obviously be applied to a cushion material equipped with another transportation means such as a vehicle (such as a railway vehicle), a ship, and an aircraft other than the automobile or applied to a cushion material of furniture or similar product.

While in the above-described first embodiment, for convenience, a description has been given of the case where the integrally molded cushion pad 1 (the rear support portion 3) made of foamed synthetic resin (made of flexible polyurethane foam) is sectionalized into four layers in the above-below direction, the respective layers are sectionalized into 15 pieces in the right-left direction, and 60 test pieces are sampled to measure the hardness, the number (the number of layers or the number of sections in the right-left direction) and the size of the test pieces are not limited to these. The size of the test piece can be set to a size that allows measurement of the hardness as necessary. Furthermore, taking into consideration the size of the test piece to allow measurement of the hardness, the number of the test pieces can be set to the number that allows sampling of the test piece having this size as necessary. It is to be noted that, taking into consideration the size the cushion pad 1 (the rear support portion 3), it is appropriate to sectionalize the rear support portion 3 into four layers or five layers. Furthermore, the size of the test piece is preferred to have 20 to 25 mm in length for each side of the quadrangular prism.

Furthermore, in the above-described first embodiment, for convenience, a description has been given of the case where the first portion 25 and the first side portion 27 are disposed in the upper center portion 22 while the second portion 26 and the second side portion 28 are disposed in the lower center portion 23. However, the positions of the first portion 25, the first side portion 27, the second portion 26, and the second side portion 28 are not limited to these. These positions can be set corresponding to the number of layers to sectionalize the cushion pad 1 (the rear support portion 3) in the above-below direction as necessary.

While in the above-described respective embodiments a description has been given of the case where the side support portions 5 and 35 are disposed in the cushion pads 1 and 30, this should not necessarily be construed in a limiting sense. The side support portions 5 and 35 can be omitted. This is because the cushion pads 1 and 30 (the support portion 2) are excellent in holding property (restraint property) in the right-left direction, that is, of the side portions of the buttocks and the thigh.

While in the above-described respective embodiments a description has been given of the case where the rear support portion 3 have a predetermined hardness distribution, the front support portion 4 can also be set to have a hardness distribution similar to that of the rear support portion 3. This allows reducing not only the wobbling feeling of the buttocks but also the wobbling feeling of the thigh.

While in the above-described respective embodiments a description has been given of the cushion pads 1 and 30 where the longitudinal groove 6 and the lateral grooves 7, 8, and 9, which are depressed on the surface, are used to pull and secure the surface skin (not shown), this should not necessarily be construed in a limiting sense. It is obviously possible to employ a cushion pad where an adhesive is applied over the surface so as to bond (attach) the surface skin.

While in the above-described second embodiment a description has been given of the case where the seating portion 31, the upper center portion 32, the lower center portion 33, and the bottom surface portion 34 are all formed with the flexible polyurethane foam (molded urethane) molded by the molding die in a predetermined shape, this should not necessarily be construed in a limiting sense. It is obviously possible to employ other materials. The other materials include, for example, slab urethane formed by cutting off the molded flexible polyurethane foam, chip urethane formed by crushing the listing and similar material generated in the manufacturing process of the flexible polyurethane foam, a three dimensional net-like body constituted of a plurality of three-dimensionally intertwined fibers made of synthetic resin, a fiber body such as solid cotton, a synthetic resin-made elastic body such as urethane rubber and thermoplastic elastomer. Laminating these materials allows obtaining a predetermined hardness distribution. The hardnesses, the densities, and the shapes of the seating portion 31, the upper center portion 32, the lower center portion 33, and the bottom surface portion 34 are set as necessary by, for example, selecting materials, designing the cavity shape of the molding die, cutting, and machining.

Furthermore, in the above-described second embodiment, a description is given of the case where the respective layers of the seating portion 31, the upper center portion 32, the lower center portion 33, and the bottom surface portion 34 are formed in a tabular shape. This should not necessarily be construed in a limiting sense. These layers can obviously be formed in a curved plate shape. This is because the seating portion 31, the upper center portion 32, the lower center portion 33, and the bottom surface portion 34 can be molded into a predetermined shape by mold forming, cutting, or similar method. It is obviously possible to form these layers in a curved plate shape so as to dispose the portion having a large hardness on the lateral side of the buttocks of the seated person.

The invention claimed is:

1. A cushion pad comprising
a support portion having: a seating surface on which a seated person is seated; and a bottom surface on an opposite side to the seating surface,
the support portion comprising, in a vertical direction from the seating surface to the bottom surface, equally sectionalized layers including a seating portion layer, an upper center portion layer, a lower center portion layer, and a bottom surface portion layer, a hardness increasing in the vertical direction in the order corresponding to the seating portion layer, the upper center portion layer, the lower center portion layer, and the bottom surface portion layer, and
wherein a hardness increases in the horizontal direction of each of the layers from a center of each layer to outer sides of each layer, such that the seating portion layer has a relative hardness at outer sides that is less than the hardness of outer sides of the lower center portion layer and outer sides of the bottom surface portion layer.

2. The cushion pad according to claim 1,
wherein a ratio of the hardness of outer sides of the upper center portion layer to the hardness of a center of the upper center portion layer is set to a value smaller than a value of a ratio of the hardness of outer sides of the lower center portion layer to the hardness of a center of the lower center portion layer.

3. The cushion pad according to claim 2,
wherein the outer sides of the upper center portion layer and the outer sides of the lower center portion layer are portions compressed by the seat pressure of the buttocks of a seated person, and are positioned on an outer side in the right-left direction of the right and left ischial tuberosity portions of the seated person seated on the seating surface.

4. The cushion pad according to claim 1,
wherein a hardness of a portion positioned in a center in the horizontal direction of the bottom surface portion layer including the bottom surface is equal to or more than a hardness 1.1 times as large as a hardness of a portion positioned in a center in the horizontal direction of the seating portion layer including the seating surface.

5. The cushion pad according to claim 1,
wherein a hardness of the center of each layer increases from the seating surface side toward the bottom surface side.

6. The cushion pad according to claim 1,
wherein a hardness of outer sides of the upper center portion layer and outer sides of the lower center portion layer increases from the seating surface side toward the bottom surface side.

7. The cushion pad according to claim 1,
wherein the support portion is integrally molded by a single foamed synthetic resin material.

* * * * *